United States Patent [19]
Waigand

[11] 4,419,653
[45] Dec. 6, 1983

[54] VARIABLE RESISTANCE SWITCH

[75] Inventor: Helmut Waigand, St. Georgen, Fed. Rep. of Germany

[73] Assignee: Bosch-Siemens Hausgeräte GmbH, Stuttgart, Fed. Rep. of Germany

[21] Appl. No.: 311,394

[22] Filed: Oct. 14, 1981

[30] Foreign Application Priority Data

Oct. 17, 1980 [DE] Fed. Rep. of Germany ....... 3039256

[51] Int. Cl.³ ............................................. H01C 10/10
[52] U.S. Cl. ...................................... 338/114; 338/99
[58] Field of Search ........................... 338/114, 69, 99; 84/DIG. 7

[56] References Cited

U.S. PATENT DOCUMENTS

| 2,044,080 | 6/1936 | Kemper | 338/114 X |
| 2,445,660 | 7/1948 | Bruestle | 338/114 |
| 3,927,593 | 12/1975 | Kawamura | 338/65 X |
| 3,974,470 | 8/1976 | DuRocher | 338/114 |

Primary Examiner—C. L. Albritton
Attorney, Agent, or Firm—Herbert L. Lerner; Laurence A. Greenberg

[57] ABSTRACT

Variable resistance switch of a continuously-variable resistance pressure-dependent measurement sensor for triggering a switching operation of an electrical evaluating circuit through a compressive loading, including an elastic layer being formed of elastomeric material interspersed with electrically conductive particles and being deformable with increasing application of force, and a conductive surface disposed opposite the elastic layer.

5 Claims, 6 Drawing Figures

VARIABLE RESISTANCE SWITCH

The invention relates to a variable resistance switch or contact, which triggers a switching operation for an after connected electrical circuit arrangement through compressive loading, by using an elastomeric material in which particles of a conducting material are embedded.

A well-known procedure is to have elastomers such as silicon rubber provided with particles of a conducting material in order to use this material for switching purposes. Devices of this type are shown in German Published Non-Prosecuted Applications Nos. DTOS 20 45 385 and DTOS 22 61 683. Normally, the electrically conducting material used is carbon black or a metallic powder. The advantage of known arrangements such as these is that they can be used for obtaining especially operatively safe configurations and high resistance ratios effective between switch-on and switch-off states. Furthermore, elastomeric layers such as these being interspersed with electrically conducting particles, have also been used for contacting switch elements or gates. In this case as well, use is made of the fact that by means of the elasticity of the elastomeric material a safe contact is made, and that by means of a proper enrichment or doping with electrically conducting particles, the contact resistance remains substantially constant on one hand, and is minimized to an extreme on the other hand. However, there is also evidence of a specified interdependence between the actuating force input and the resistance rate output of these elastomeric materials being interspersed with electrically conducting particles (see in this context the publication Markt und Technik, Issue 37 of Sept. 17, 1979, p. 84). Known characteristics show a resistance/applied torque relationship having a characteristic or curve branch plotted substantially parallel to the resistance axis, this branch in the area above the resistance value 0 being relatively quickly switched to a characteristic or curve branch plotted parallel to the torque axis. This characteristic time slope agrees with its known applicability to a substantially binary switch.

It is accordingly an object of the invention to provide a variable resistance switch which overcomes the hereinafore-mentioned disadvantages of the heretofore-known devices of this general type, and to provide measuring means being variable in their ohmic resistance rating through pressure effects, in order to carry out pressure measurements electrically without high technological input.

With the foregoing and other objects in view there is provided, in accordance with the invention, a variable resistance switch or contact of a continuously-variable resistance pressure-dependent measurement sensor for triggering a switching operation of an electrical evaluating circuit through a compressive loading, comprising an elastic layer being formed of elastomeric material slightly interspersed with electrically conductive particles, as compared to known elastomeric switches being interspersed with particles, and being deformable with increasing application of force, and a conductive surface disposed opposite the elastic layer.

Contrary to other known arrangements, wherein elastomeric switch contacts interspersed with electrically conducting particles are used for carrying out maximally binary-digitized switching operations, with the arrangement according to the invention the elastomeric material is interspersed with conducting particles in such a modified way that upon any force effective rise, this arrangement undergoes a change in its resistance rating being maximally directly proportional to the force effect. In this way this arrangement can be usefully applied to an electrically analyzable sensor or pickup for motor vehicles. The term "power measurements" also covers weight determinations. The use of elastomers has the known advantage of preventing the environment from having a detrimental effect on material characteristics under normal conditions. Because of the well known excellent suitability of elastomeric materials as supporting surfaces as well, such as for containers and vessels, supports such as these constructed according to the invention are usable as weight sensors.

In accordance with another feature of the invention, the elastic layer has an area thereof exposed to the compressive loading, and including another layer of pure elastomeric material superimposed on the area of the elastic layer. The result thus produced is that the layer interspersed with electrically conducting particles is electrically insulated against the outside. This makes it feasible for directly inter-vulcanizing both elastomeric layers.

In accordance with a further feature of the invention, there is provided a further elastic layer formed of elastomeric material interspersed with electrically conductive particles, and terminal contacts rigidly connected on the elastic layers, the elastic layers being disposed opposite each other in a surface area. This bilateral arrangement of elastomeric materials has an especially optimal effect on control applications. This is because the contact resistance on any power rise effective between the elastomeric material layers being interspersed with conducting particles is of an especially variable type.

This positive effect is still further compounded into a particularly surprising effect, in accordance with an added feature of the invention, wherein the oppositely disposed elastic layers are mutually interlocked.

In accordance with an additional feature of the invention, there is provided a contact having two surfaces and being disposed opposite the elastic layer. This arrangement has two contact surfaces, because of which an optimal force-path characteristic is also obtained. Moreover, this arrangement has a highly-rated industrial manufacturability as a flat structural element.

In accordance with a concomitant feature of the invention, there is provided a contact having two surfaces and being disposed opposite the elastic layer, and a planar base plate being formed of electrically insulating material and being vulcanized together with the pure elastomeric material layer; in this case both terminal contacts are vulcanized along with it.

Other features which are considered as characteristic for the invention are set forth in the appended claims.

Although the invention is illustrated and described herein as embodied in a variable resistance switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
FIG. 1 is a diagrammatic side elevational view of two elastomeric layers of a switch or contact in an arrangement according to the invention.
Figure 2:
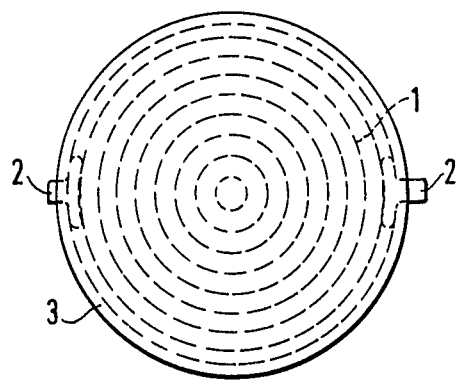
FIG. 2 is a top plan view of the arrangement of FIG. 1.

Referring now to the figures of the drawing and first particularly to FIGS. 1 and 2 thereof, it is seen that two layers 1 are formed from an elastomeric material which is interspersed with electrically conducting particles that may include carbon black, precious-metallic powder, or copper powder. The opposite surface of the elastomeric layers 1 are disposed in a counter-toothed or interleaved manner, resulting in an extended surface. Both elastomeric layers 1 are provided with copper contact terminals 2, which establish a connection to the electrical analyzer circuit. The elastomeric layers 1 which are interspersed with electrically conducting particles have layers 3 made of pure elastomeric material vulcanized thereon for generating an electrical insulation against the environment.

Figure 3:
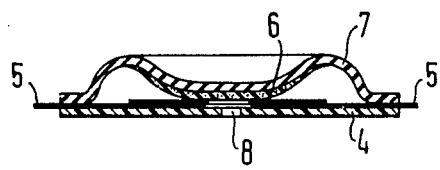
FIG. 3 is a diagrammatic cross-sectional view of another embodiment of the switch or contact arrangement of the invention having an elastomeric layer.
Figure 4:
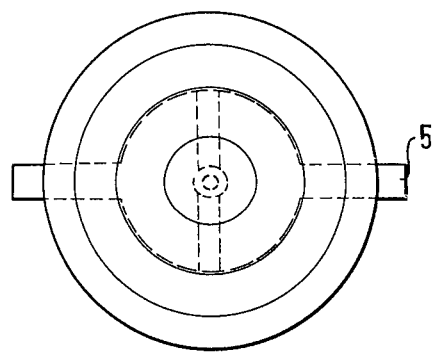
FIG. 4 is a top plan view of the arrangement according to FIG. 3.

In the embodiment according to FIGS. 3 and 4, a copper-coated conductor disk 4 made of an electrical insulator material is formed as a carrier disk, on which contact terminals 5 are disposed by means of known etching processes. Opposite both contact terminals 5 there is disposed a layer 6 made of an elastomeric material with interspersed electrically conducting particles. Vulcanized together with the layer 6 is another, superposed layer 7 made of a purified elastomeric material, which in the vicinity of its edges is vulcanized on the conductor disk or circuit board 4 and on the contacts 5 disposed thereon. The center of the disk 4 is perforated by an opening 8 for pressure balancing purposes.

Figure 5:
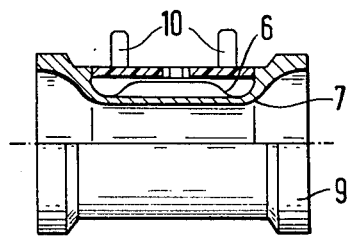
FIG. 5 is a diagrammatic partially cross-sectional view of a pressure sensor disposed in a pipe joint.

FIG. 5 shows a pipe joint or fitting 9 in a partially cross-sectional side view, in which a pressure and resistance transducer element 6, 7 similar to the embodiment according to FIGS. 3 and 4 is inserted. The terminal contacts 10 extend radially outward.

Figure 6:
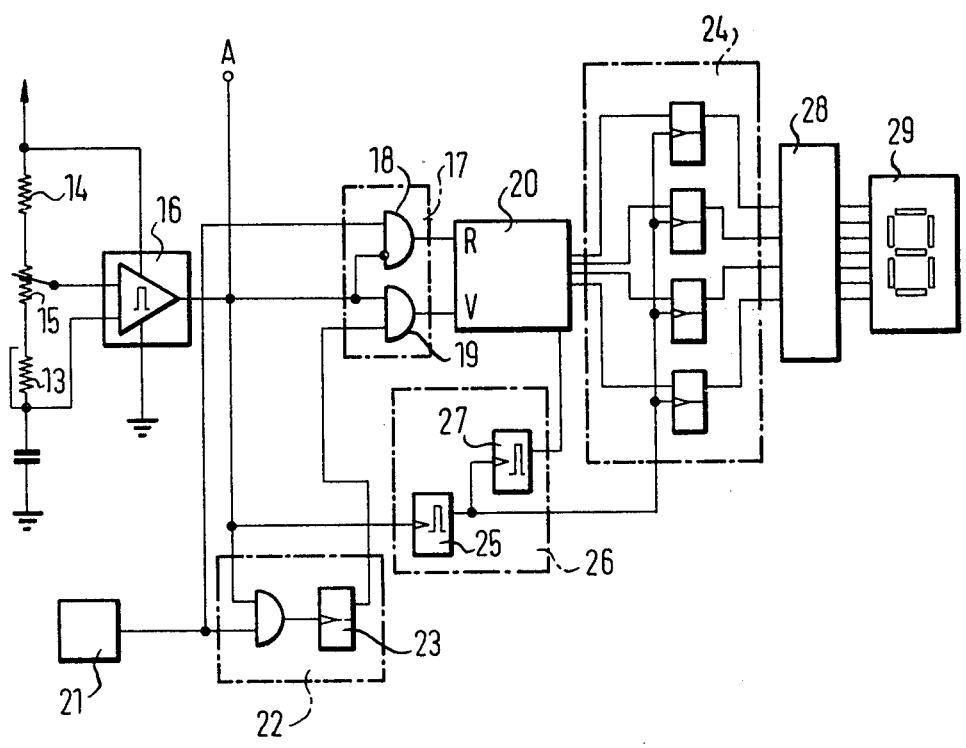
FIG. 6 is a diagrammatic and schematic circuit diagram of the resistance variable switch connecting an analyzer circuit.

FIG. 6 shows a circuit arrangement for analyzing the variable resistance rating of switching means such as those described with reference to FIGS. 1 through 5. A variable resistance value switch 13 serves as a measuring sensor for variables in conjunction with a further resistor 14, and a balancing resistor 15, and a supply voltage. The variable taps of the resistors are fed to a clock pulse circuit 16. Any change in the resistance rating of the resistor 13 also results in a corresponding change of the voltage being applied across the clock pulse circuit 16. The circuit 16 which is operated in the astable state forms pulse sequences as an oscillator, wherein the pulse duration or length as well as the length of the pulse pause or gap is a function of the resistance value of the switch 13. Using the clock pulse circuit, the pulse duration equals $0.7(R_3+R_4)C$, and the pulse pause equals $0.7 R_3 C$. The clock frequency produced therefrom at the output of the clock pulsing stage 16 for the pulse trains $f=1.42/(R_3+2R_4)\cdot C$. This variable is made available at the output A for further processing. Simultaneously, the output of the clock pulse circuit 16 is fed to a logic linkage circuit 17, including two AND-logic elements or gates 18 and 19. The signal at the AND-logic element 18 is applied to an inverting input R, while the signal at the AND-logic element 19 is applied to a non-inverting input V. The AND-logic elements 18 and 19 serve for the through-connection of clock pulses to a forward/backward counter 20. A clock generator 21, which may be from a power supply frequency, generated pulse counts which are fed on one hand to the AND-logic element 18, and on the other hand to the input of the logic element 19 through a pulse splitter stage 22. The pulse splitter stage 22 contains a flip-flop 23, which divides the excited clock pulse at a rate of 1:2.

By means of these switching operations during the pulse duration, the forward/backward counter 20 is caused to count forward or through its forward-counting or non-inverting input V by using half of the clock frequency put out by the clock generator 21. When a pulse pause at the output of the clock pulse stage 16 occurs, the forward/backward counter 20 is given a backward-counting clock frequency through the AND-logic linkage element 18 and the input R.

Connected after or downstream of the forward/backward counter 20 is a four-position or digit memory module 24, which picks up the count of the forward/backward counter 20 following each pulse pause cycle. This pickup is made by a first monostable flip-flop 25 of a trigger circuit 26, which is triggered by the leading edge of the pulse of the clock pulse circuit 16. A second monostable flip-flop 27 connected after or downstream of the first monostable flip-flop 25 affects the reset input of the forward/backward counter 20. This means that now the counting operation starts all over again. The content of the memory module 24 is put on display by means of a seven-segment display 29 connected through a BCD/7-segment decoder 28.

There are claimed:

1. Variable resistance switch of a continuously-variable resistance pressure-dependent measurement sensor for triggering a switching operation of an electrical evaluating circuit through a compressive loading, comprising an elastic layer formed of elastomeric material interspersed with electrically conductive particles and being deformable with increasing application of force, said elastic layer being pan-shaped and having a lower substantially planar surface, and a conductive surface being in contact with said lower substantially planar surface of said elastic layer.

2. Variable resistance switch according to claim 1, wherein said elastic layer has an area thereof exposed to the compressive loading, and including another layer of pure elastomeric material superimposed on said area of said elastic layer.

3. Variable resistance switch according to claim 1 or 2, including a contact having two surfaces and being disposed opposite said elastic layer.

4. Variable resistance switch according to claim 2, including a contact having two surfaces and being disposed opposite said elastic layer, and a planar base plate being formed of electrically insulating material and being vulcanized together with said pure elastomeric material layer.

5. Variable resistance switch of a continuously-variable resistance pressure-dependent measurement sensor for triggering a switching operation of an electrical evaluating circuit through a compressive loading, comprising two elastic layers each being formed of elastomeric material interspersed with electricall conductive particles and being deformable with increasing application of force, each of said elastic layers having a respective mutually opposite surface with interlocking saw tooth-shaped ridges formed thereon, and terminal contacts rigidly connected on said elastic layers.

* * * * *